United States Patent
Armstrong, Jr. et al.

(10) Patent No.: US 6,298,345 B1
(45) Date of Patent: Oct. 2, 2001

(54) DATABASE JOURNAL MECHANISM AND METHOD THAT SUPPORTS MULTIPLE SIMULTANEOUS DEPOSITS

(75) Inventors: William Joseph Armstrong, Jr., Kasson; Gary Ross Ricard, Chatfield; Timothy Joseph Torzewski, Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/113,641

(22) Filed: Jul. 10, 1998

(51) Int. Cl.[7] .................................................. G06F 17/30
(52) U.S. Cl. ................. 707/8; 707/201; 707/202
(58) Field of Search .................. 707/8, 201, 202

(56) References Cited

U.S. PATENT DOCUMENTS

| | | | |
|---|---|---|---|
| 4,020,466 | * | 4/1977 | Cordi et al. ........................ 707/201 |
| 4,077,059 | * | 2/1978 | Cordi et al. ........................ 711/122 |
| 4,159,517 | * | 6/1979 | Paradine et al. ..................... 710/57 |
| 4,819,156 | * | 4/1989 | DeLorme et al. .................... 714/15 |
| 5,214,780 | * | 5/1993 | Ingoglia et al. ..................... 709/106 |
| 5,386,554 | * | 1/1995 | Nozaki ................................ 707/202 |
| 5,553,285 | * | 9/1996 | Krakauer et al. .................... 707/202 |
| 5,594,915 | * | 1/1997 | Atalla ................................... 712/28 |
| 5,778,168 | * | 7/1998 | Fuller .................................. 714/18 |
| 6,023,707 | * | 2/2000 | Hamada et al. ..................... 707/202 |
| 6,052,696 | * | 4/2000 | Euler et al. .......................... 707/202 |

* cited by examiner

Primary Examiner—Jack Choules
Assistant Examiner—Cheryl Lewis
(74) Attorney, Agent, or Firm—Martin and Associates, L.L.C.; Derek P. Martin

(57) ABSTRACT

A journal mechanism for a database allows simultaneous deposits on multiple journal arms. According to a first embodiment, a journaling system maintains the time-order of interdependent deposits on the journal, but does not necessarily maintain the time-order of deposits that are independent of each other, thereby providing multiple simultaneous deposit points on the journal. The first embodiment provides excellent scaling of journal functions as processors are added to a database computer system. According to a second embodiment, a journaling system maintains the time-order of deposits on the journal, but allows a group of deposits known as a "bundle" to span multiple journal arms, thereby providing multiple simultaneous deposit points on the journal. The second embodiment provides good scaling while providing compatibility with known database systems. The present invention thus relieves contention for the journal that exists as the number of processors increases in a database system.

16 Claims, 11 Drawing Sheets

DATABASE JOURNAL MECHANISM AND METHOD THAT SUPPORTS MULTIPLE SIMULTANEOUS DEPOSITS

BACKGROUND OF THE INVENTION

1. Technical Field

This invention generally relates to database computer systems. In particular, the present invention relates to methods for journaling changes to a database to allow for recovery of the database should corruption of data in the database occur.

2. Background Art

Since the dawn of the computer age, computers have evolved and become more and more powerful. In our present day, computers have become indispensable in many fields of human endeavor including engineering design, machine and process control, and information storage and access. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database. A database typically has many users and processes that can change data in the database. One very important concern in database systems relates to the recovery of data should a problem, such as a power outage or system failure, cause the loss of data. Mechanisms have been developed to log or journal changes to a database so that the database can be reconstructed from the log or journal if data is lost for some reason. These mechanisms are referred to herein as journal mechanisms, realizing that different names may be used to refer to the journaling function.

The most common type of journal in modern database systems is the write-ahead journal. The write-ahead journal actually records a change to data in the database in the journal before recording the change in the database itself. In this manner, if a failure occurs between the journaling of the change and the change itself, the change will be properly made when the database is reconstructed from the journal.

Databases typically include a management mechanism that allows multiple processes to access and change data in the database at the same time. Each process, however, must record their changes in the same journal. Therefore, even though multiple processes are allowed to make changes to a database simultaneously, they must each "wait their turn" when making changes to the journal. (The act of recording change information in the journal is referred to herein as "depositing" information in the journal.) Thus, the journal can become a performance bottleneck when many processes are trying to access the journal at the same time.

While known journaling techniques allow information deposited in a journal to be written to multiple arms of a hard disk drive in parallel fashion, the deposits are typically serialized among processes to maintain the time-order of the deposits. Thus, the order of deposit reflects the order of changes in the database. In this manner the journal can be used to efficiently reconstruct the database when recovery becomes necessary. The problem, though, is that the time-ordering leaves the journal performance bottleneck in place.

The performance bottleneck of serializing entries to the journal can become an even greater problem in computing environments with multiple processors. As the number of processors increases, the number of processes that may access the database increases, causing a corresponding increase in contention for making deposits on the journal. The greater the number of processors, the more critical this performance bottleneck becomes. Without an improved mechanism and method for depositing database change information in a journal, the computer industry will continue to suffer from undue performance degradation caused by serializing deposits to the database journal.

DISCLOSURE OF INVENTION

According to the present invention, a journal mechanism for a database allows simultaneous deposits on multiple journal arms. According to a first embodiment, a journaling system maintains the time-order of interdependent deposits on the journal, but does not necessarily maintain the time-order of deposits that are independent of each other, thereby providing multiple simultaneous deposit points on the journal. The first embodiment provides excellent scaling of journal functions as processors are added to a database computer system. According to a second embodiment, a journaling system maintains the time-order of deposits on the journal, but allows a group of deposits known as a "bundle" to span multiple journal arms, thereby providing multiple simultaneous deposit points on the journal. The second embodiment provides good scaling while providing compatibility with known database systems. The present invention thus relieves contention for the journal that exists as the number of processors increases in a database system.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention is used in a database environment. For those who are not familiar with database systems, journaling, and recovery, the brief overview below provides background information that will help the reader to understand the present invention.

1. Overview

Write-Ahead Database Journals

When a change needs to be made to a database, the change needs to be recorded in a journal so that good data can be recovered if the data in the database is corrupted for some reason. Common examples of failure events that can cause data loss include: power problems, including a power surge or failure; a hardware failure; and a software failure. Many other events can cause the loss of data in a database system, and the events listed above are given by way of example and are not intended to be an exhaustive list.

A write-ahead journaling system records the requested change in the journal, then records the change in the database itself. If a failure event occurs after the change is recorded in the journal but before the change is made to the database itself, the database system would restore the state of the database at a defined point in time, then process the journal to re-do all of the changes that were made to the database since that point in time. Because the final change was journaled even though the change was not made to the data in the database, the change to the data will be done when the journal is processed for all the changes.

Storing Journals to Disk

Journals are typically stored on a direct access storage device, such as a hard disk drive. For the purpose of this specification, a direct access storage device is generically referred to as a disk, recognizing that other media and formats fall within the scope of a direct access storage device. The performance of writing a journal to disk may be enhanced by providing multiple arms on the disk drive so that different portions of the journal may be written to different arms on the disk drive simultaneously. Multiple arms therefore allow quicker writes from the journal to disk.

The current bottleneck in database journaling systems resides in the mechanism for depositing information in the journal. Because prior art journals serialize all entries to maintain time-order of the entries, this serialization can result in significant performance degradation. An example of a prior art journal and method is discussed below.

Example of Prior Art Journaling

Figure 2:
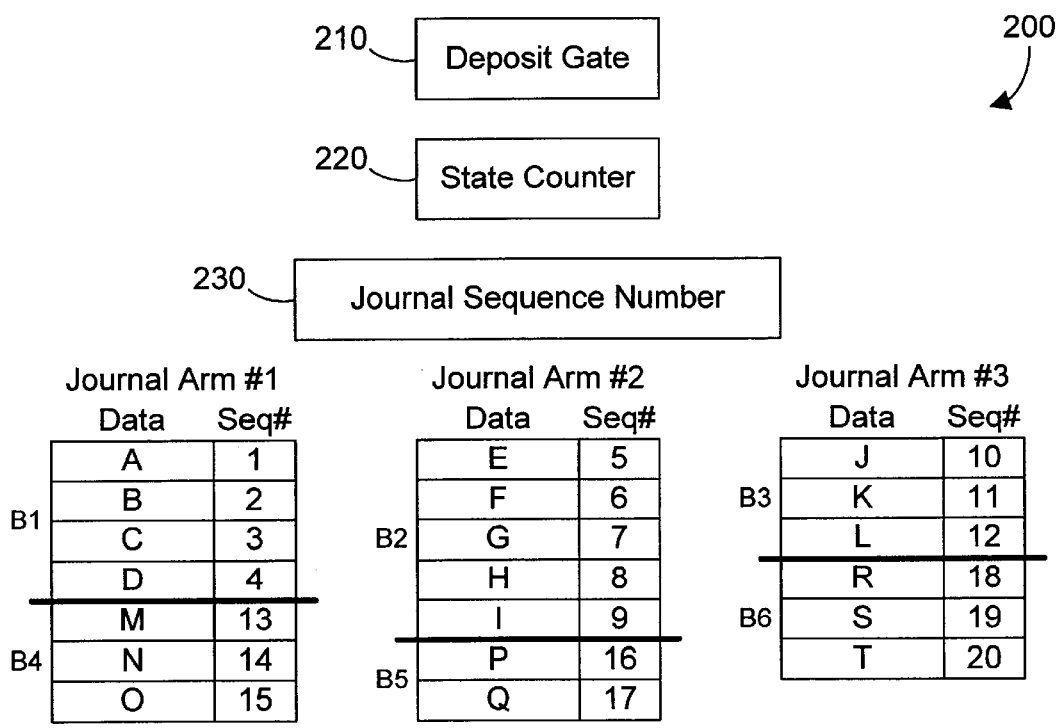
FIG. 2 is a block diagram of a prior art database journal that has three journal arms.

Referring to FIG. 2, a prior art journal 200 includes three journal arms, a deposit gate 210, a state counter 220, and a journal sequence number 230. Each of the journal arms represents an area of memory that is eventually written to disk by a physical arm of the disk drive. Each entry in journal 200 includes data and an associated sequence number that is assigned when the data is written to the journal arm. Journal 200 deposits information on its three arms in a round-robin fashion. We assume for the sake of illustration that the journal begins by depositing on arm #1. The first entry is A, which is assigned sequence number 1. B, C, and D are then deposited on arm #1, with sequence numbers 2, 3 and 4, respectively. Each entry in journal 200 may be made by a different process. In the alternative, a single process may make adjacent entries on the same arm. We assume for the purpose of illustration that the process that deposits D on the journal signals the end of a "bundle". A "bundle" as used in this specification refers to one or more journal entries that are written to disk as a group. Thus, when D is written to arm #1, the bundle is terminated (represented by the heavy line separating D from M on arm #1), and entries A–D are written to the first arm of the disk drive. While A–D are being written to disk, journal 200 can continue depositing on journal arm #2. Thus, input/output (I/O) operations to the disk can occur in parallel with deposits on the journal. We assume that entries E–I are deposited on arm #2, and the bundle is terminated by the process that writes entry I. At this point the disk I/O for arm #2 can begin even if the disk I/O for arm #1 has not yet completed. While arms #1 and #2 are performing I/O to disk, journal 200 can continue to receive deposits on arm #3. We assume that entries J, K and L are deposited on arm #3, and the bundle is terminated by the process that writes entry L. At this point the disk I/O for arm #3 can begin. Hopefully the disk I/O for arm #1 has already completed, and journal 200 can continue to deposit information on arm #1 while the I/O on arms #2 and #3 completes. If disk I/O for arm #1 has not completed, entries will continue to be deposited on arm #3 and no disk I/O for arm #3 will occur until the disk I/O for arm #1 completes.

Deposit gate 210 is a control or gate mechanism that allows a process to deposit information in journal 200. Deposit gate 210 can only be owned by one process at a time, so once a process gets deposit gate 210, other processes cannot get deposit gate 210 until the process that owns deposit gate 210 completes its deposit(s) and releases deposit gate 210.

State counter 220 is used to control the timing of releasing processes that write information to the journal 200. The state counter has a numerical value that may be written by any of the processes that write to journal 200. Each process deposits entries that are assigned a sequential sequence number. The state counter 220 is the mechanism that is used to control when the processes that made those entries are released, based on the sequence number of the entries. When a bundle I/O completes, the process that issued the I/O writes a value to the state counter that corresponds to the sequence number of the last entry in the bundle. All processes must wait until the state counter is greater than or equal to the sequence number of their entries. By writing a value to the state counter, the process that has written the bundle releases all other processes that have entries in the bundle. An example will help to clarify the use of the state counter.

Referring again to FIG. 2, let's assume that a first process makes a deposit of entry A on arm #1. Let's also assume that a second process makes a deposit of B and a third process makes a deposit of C. None of these entries result in the end of the bundle, so each of these processes must wait for another process to do the I/O for the bundle. When a fourth process makes a deposit of D and determines that it is ready to do the I/O for the bundle B1, it writes the bundle to disk, then sends a value of four to the state counter, which results in the first, second and third processes being released, because they have sequence numbers less than four. The fourth process that made deposit D is already released. Otherwise, it couldn't sent the count to the state counter that released processes A, B and C. The state counter thus provides a simple and effective way to selectably release multiple processes with one send.

The journal sequence number 230 in FIG. 2 is simply a counter that provides the next sequence number in numerical order. When the sequence number in journal sequence number 230 is assigned to an entry, the value of journal sequence number 230 is incremented so that the next entry will get the next sequential number.

Journal 200 in FIG. 2 is shown with three arms simply to illustrate the concepts of prior art journals. A journal is typically designed with a number of arms that makes it unlikely that the journal will have to wait for disk I/O to complete before receiving more deposits. Thus, the number of arms on a journal can be any suitable number, up to the number of physical disk arms on the computer.

Figure 3:
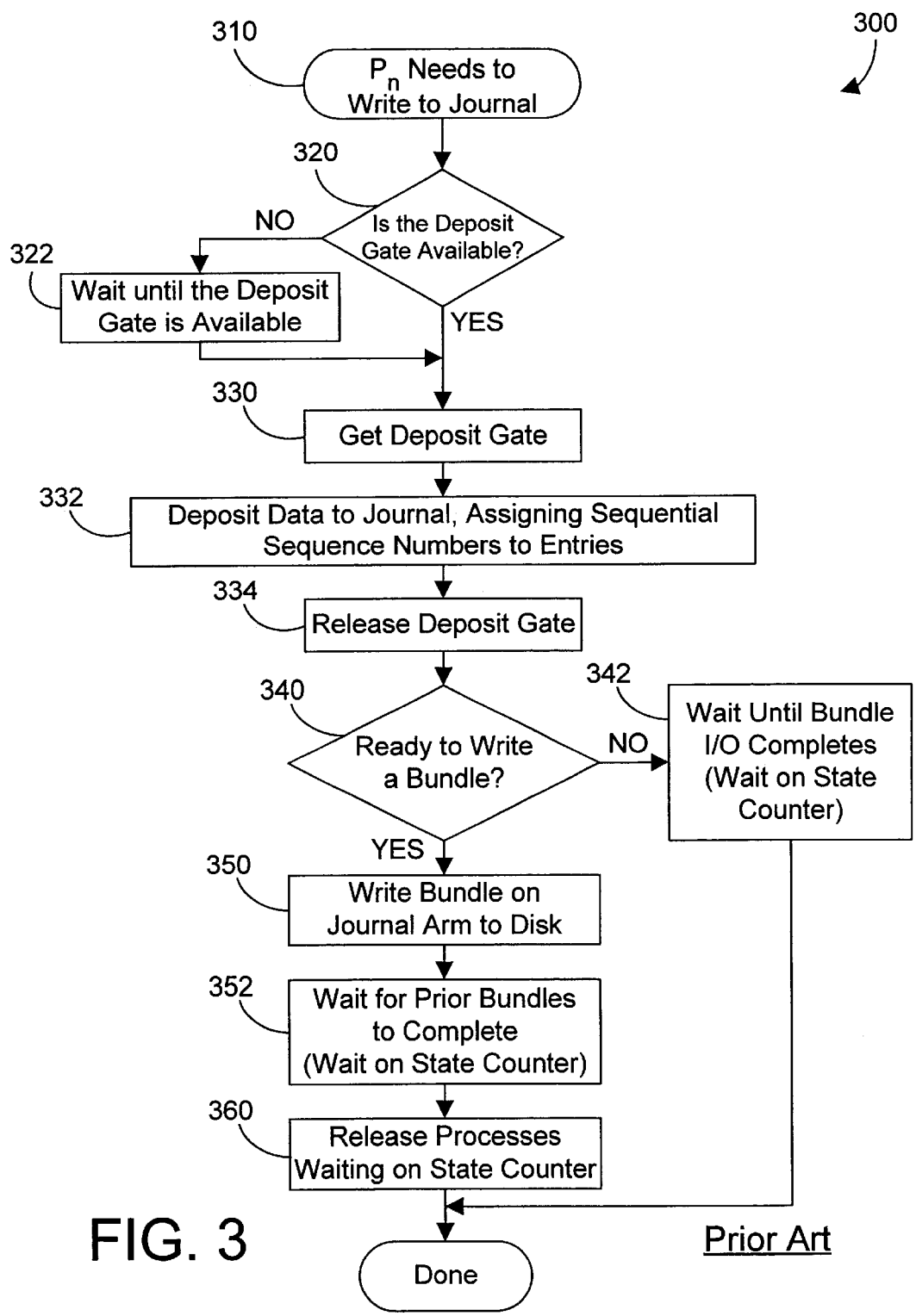
FIG. 3 is a flow diagram of a prior art method for depositing information on the journal of FIG. 2.

A detailed method 300 of FIG. 3 illustrates how a prior art journal, such as the one shown in FIG. 2, deposits journal entries on its arms and writes these entries to disk. Method 300 begins when a process n (denoted $P_n$ in step 310) needs to write an entry to a journal, such as journal 200 of FIG. 2. First, the process must determine if the deposit gate is available (step 320). If so (step 320=YES), the process gets the deposit gate (step 330). If not (step 320=NO), the process must wait until the deposit gate is available (step 322), then get the deposit gate (step 330). Once a process has the deposit gate, it deposits data to the journal as journal entries, assigning sequential sequence numbers to the journal entries (step 332). Note that a process may deposit one entry, or may deposit multiple entries on an arm. The deposit gate determines in round-robin fashion on which arm the journal information is stored, as explained above. Once the process has completed depositing its journal information, it releases the deposit gate (step 334).

The current process must then determine whether or not a bundle that includes 342). The process knows when bundle I/O completes by monitoring the state counter 220. When the state counter value is less than or equal to the sequence number of the entry written by the process, the process is released, which indicates to the process that its entry was successfully written in journal 200.

When a process determines that it is ready to write a bundle (step 340=YES), it issues an I/O to disk, which causes the writing of the bundle to disk (step 350). After writing the bundle, the process waits for an y prior bundles to complete their I/O by waiting on the state counter (step 352). Because prior bundles have lower sequence numbers, the state counter will not allow a process waiting on a later bundle to precede the completion of an earlier bundle. Once the I/O for any prior bundles complete (step 352), the process writes to the state counter to release all the processes that are waiting on the state counter (step 360). This step causes any processes that are waiting in step 342 to be released. At this point method 300 is ready to be repeated for all other processes.

Figure 4:
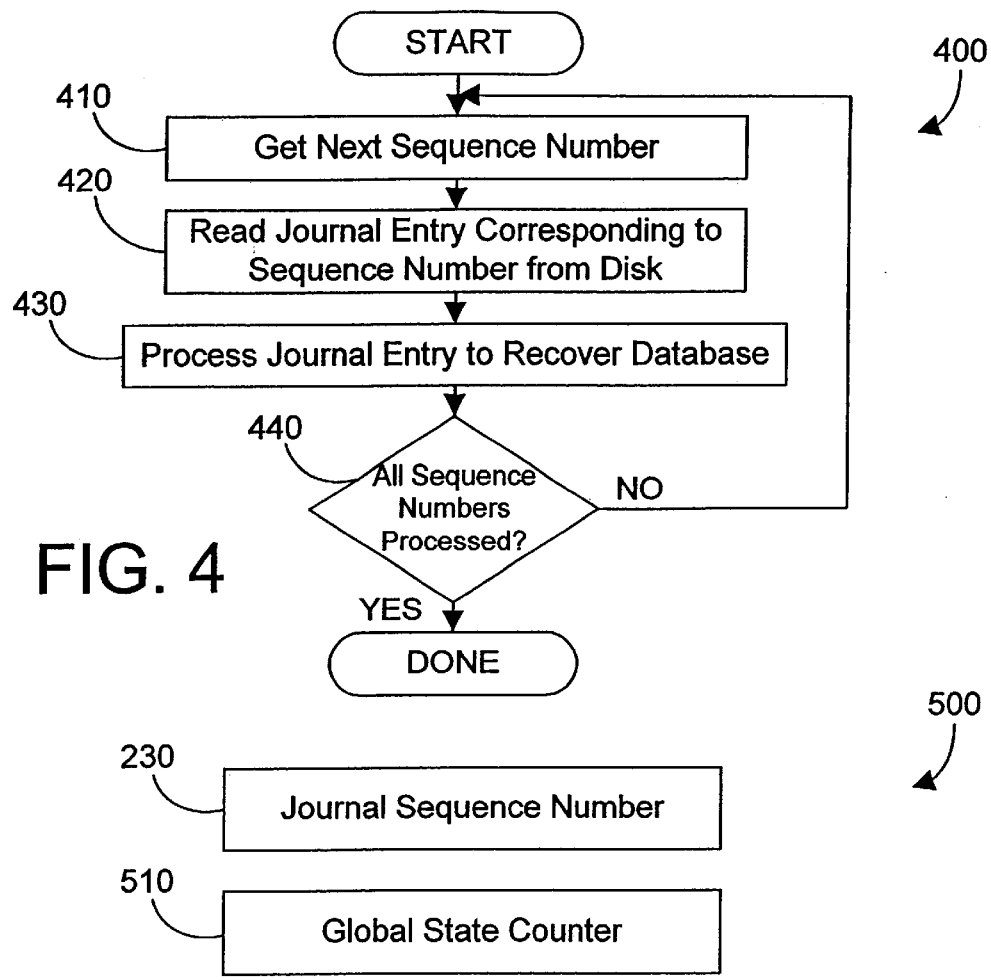
FIG. 4 is a flow diagram of a method for recovering data from a database using the information stored in a journal.

When a failure event occurs, the journal is used to reconstruct the database. In general, a database is backed up periodically by copying the contents of the database to secondary storage, such as a disk or tape drive. The journal keeps track of all the changes that have occurred since the last backup of the database. Thus, if the last backup on a system was performed a week ago, reconstructing the database would consist of reading in the database from the backup, and processing the changes logged in the journal on the data since that backup. A method 400 for recovering a database is shown in FIG. 4. Method 400 begins by getting the next sequence number from the journal sequence number (such as 230 in FIG. 2). The first pass through method 400, the sequence number is assumed to be set to zero, so step 410 of getting the next sequence number retrieves sequence number one (step 410). The journal entry corresponding to sequence number one is read from disk (step 420), and processed to recover the database information (step 430). If all sequence numbers in the journal have been processed (step 440=YES), the recovery process is complete. If all sequence numbers in the journal have not been processed (step 440=NO), method 400 loops back to step 410, getting the next sequential sequence number, and continuing until all sequence numbers have been processed (step 440=YES).

2. Detailed Description of the Preferred Embodiments

While the prior art journal 200 of FIG. 2 succeeds in performing simultaneous writes on different arms to disk, it still serializes all deposits on the journal. For database systems with many processes making changes to the database, this serialization of journal entries can become a significant bottleneck to system performance. In modern multi-processor systems, as the number of processors increases, the contention for the journal likewise increases. The preferred embodiments disclosed herein provide a significant improvement over the prior art by allowing simultaneous deposits on a database journal in a manner that is easily scaled to a relatively high number of processors. Note that the term "simultaneous" is used herein to denote that different processes may make deposits to different journal arms without one process waiting for the other to finish, and not that both processes are necessarily depositing data on their respective arms at the exact same instant in time.

Figure 1:
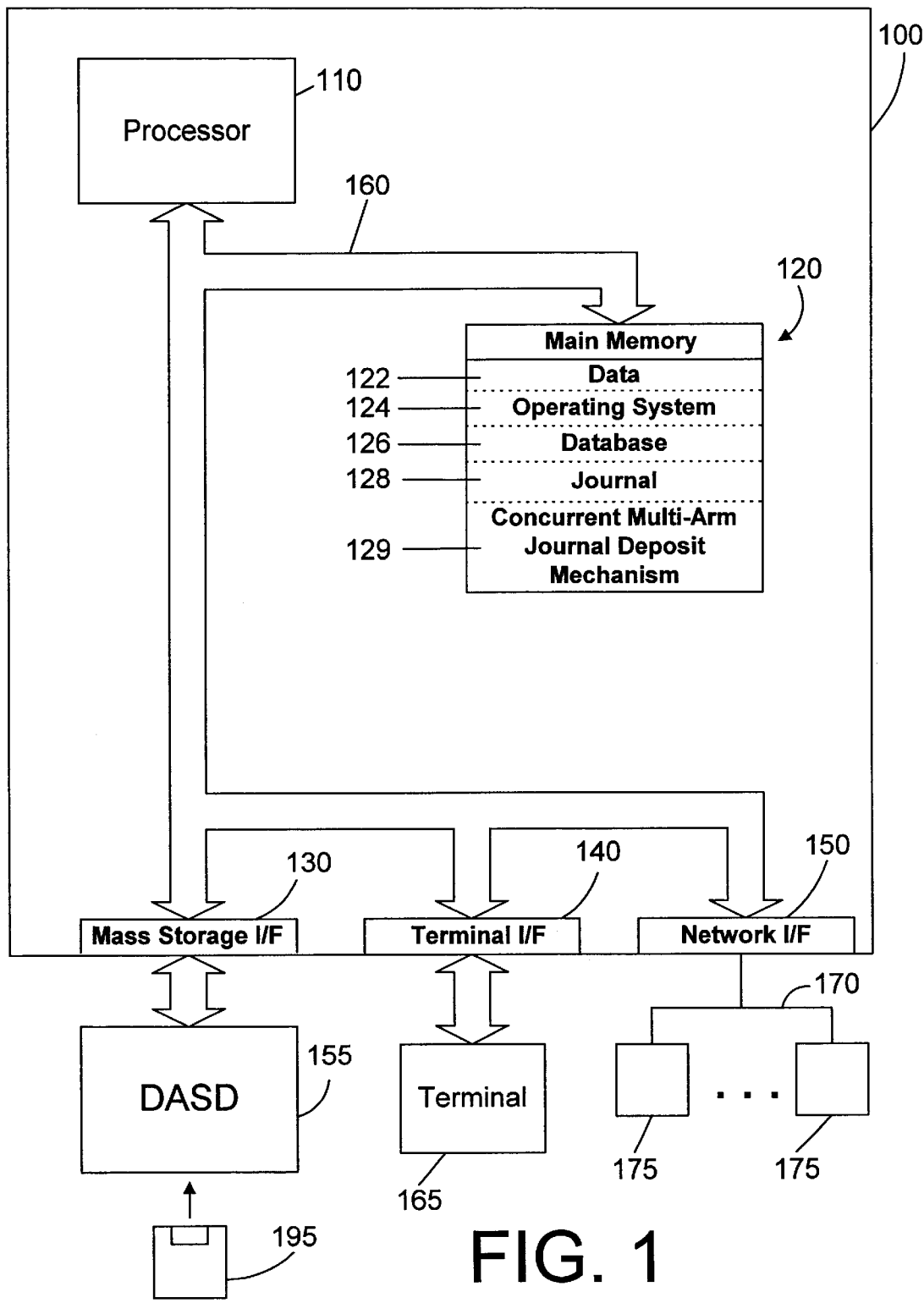
FIG. 1 is a block diagram of an apparatus in accordance with a preferred embodiment of the present invention.

Referring to FIG. 1, a computer system 100 in accordance with the preferred embodiment is an IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, a database 126, a journal 128, and a concurrent multi-arm journal deposit mechanism 129 in accordance with the preferred embodiments. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, database 126, journal 128, and concurrent multi-arm journal deposit mechanism 129 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system.

Database 126 is a datastore of information. The concepts of a database are well-known to those skilled in the art. Database 126 expressly encompasses all forms and formats for databases, whether currently known or developed in the future.

Journal 128 is a datastore of information that allows data stored in the database to be reconstructed should a failure event cause the loss of data. A journal is one specific name for a datastore of information that facilitates the recovery of data in a database, and is used herein in a generic sense to represent any and all types of datastores that are or may be used to store information relating to data recovery in a database. Journal 128 is typically stored on a mass storage device such as DASD 155. Journal 128 residing in main memory 120 represents a data storage area that is divided into arms, such as arm #1, arm #2, and arm #3 of FIG. 2. These arms are referred to as "logical arms" because they constitute a portion of main memory 120 that correlates to physical arms on DASD 155. After storing information into the part of journal 128 in main memory, disk I/O is generally performed to write the contents to disk, such as DASD 155.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. While terminal interface 140 is provided to support terminal communication with computer system 100, note that communications with computer system 100 may occur via network interface 150 instead of or in addition to communications via terminal interface 140.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, database 126 could reside on one system while journal 128 resides in a different system.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

The remainder of this specification describes the details of concurrent multi-arm journal deposit mechanism 129 in FIG. 1. Two specific embodiments for journal deposit mechanism 129 are presented. The first embodiment is represented by the system and method in FIGS. 5–7. The second embodiment is represented by the system and method in FIGS. 8 and 9. While the specific embodiments presented herein vary in their implementation, both embodiments are based on the same underlying principles discussed below.

Prior art journaling systems have always assumed that the journal must be a sequential time-ordered log of the database changes. The present invention recognizes that this restriction is not really necessary, provided that all interdependent database changes are seen in time-order. Thus, a series of changes to a particular record or the sequence of changes which indirectly update keys of an index must all be journaled in time-order, but independent changes have no time-order requirement. As long as one database change does not affect another, either directly or through some side-effect, it is safe to place the journal entries in any order on the journal. The net result of recovering from these journaled entries will be identical regardless of the entries' relative positions in the journal. Note that one may destroy the physical location time-ordering that is so much a part of the prior art journaling systems if independent entries no longer have any relative positional requirements so long as the time stamp still identifies the time-order if needed. The first embodiment allows for great scaling capability, but at the cost of significant changes to the database system. The second embodiment allows for good scaling up to a limit with changes only to the journaling system, thereby providing the advantage of multiple simultaneous deposits on the journal while maintaining compatibility with existing database systems. Each of these two embodiments are presented below.

The first embodiment recognizes that database record locks guarantee the time-order of interdependent entries in the journal. Consider the general sequence of operations, at a high level, that occur when a database record is updated when the database has a write-ahead journal: 1) a database record lock on the record to be changed is acquired; 2) index maintenance is performed, including the journaling of the "before image" of any changed index page; 3) the change is entered into the journal; 4) the change is made to the database record; and 5) the database record lock on the changed record is released. Note that the database record lock is held across the entire process, including the journaling step. This implies that the database serializes the journal deposit relative to this record change. Thus, if only this record were being updated, then no journal serialization would be necessary. Database locks would guarantee that all updates to this record appear on the journal in time-order.

This observation implies that as long as the process updating the database record waits for journal disk I/O to complete before making the actual record change and releasing the database record lock, then journal sequence numbers do not need to be assigned to bundled journal entries until just before the bundle is written to disk. The record lock will guarantee that interdependent database entries appear on the journal in time-order even if multiple journal deposits are occurring simultaneously. With this in mind, it is feasible to construct a functional journal with multiple deposit points, each controlled by its own serialization mechanism. Only the sequence numbers need be serialized across the entire journal, and this can be done with a compare-and-swap function, which yields good performance.

Figure 5:
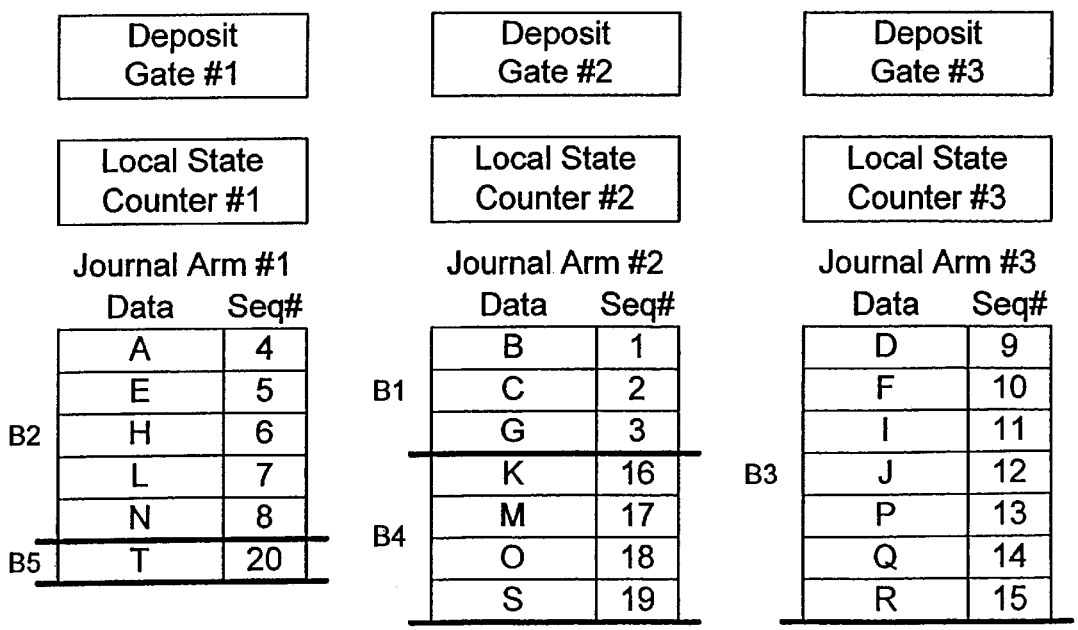
FIG. 5 is a block diagram of a database journal in accordance with a first embodiment of the present invention.

Referring now to FIG. 5, a journaling system 500 in accordance with the first embodiment supports simultaneous deposits on different logical arms while providing excellent scaling capability. Journaling system 500 is one suitable embodiment for journal 128 and concurrent multi-arm journal deposit mechanism 129 shown in FIG. 1. Journaling system 500 includes: a journal sequence number 230; a global state counter 510; a deposit gate for each logical arm in the journal; a local state counter for each logical arm in the journal; and logical arms. For the specific example shown in FIG. 5, a journal with three arms is arbitrarily selected to illustrate the concepts of the first embodiment.

In examining the data deposited on each arm in journaling system 500, the time-order of the data is represented by the alpha order of the data in each entry. Thus, the first entry is entry A on arm #1; the second is entry B on arm #2, and so on through entry T on arm #1. Notice, however, that the sequence numbers for the entries do not correspond to the time-order of the entries. In the first embodiment of the invention, the sequence numbers are not assigned to the entries until just before a bundle is written to disk. The sequence numbers within a bundle will be sequential, but because the journal can perform multiple deposits simultaneously on multiple arms, the sequence numbers do not track the time-order of entries, as with journaling systems of the prior art (such as journaling system 200 of FIG. 2).

Figure 6:
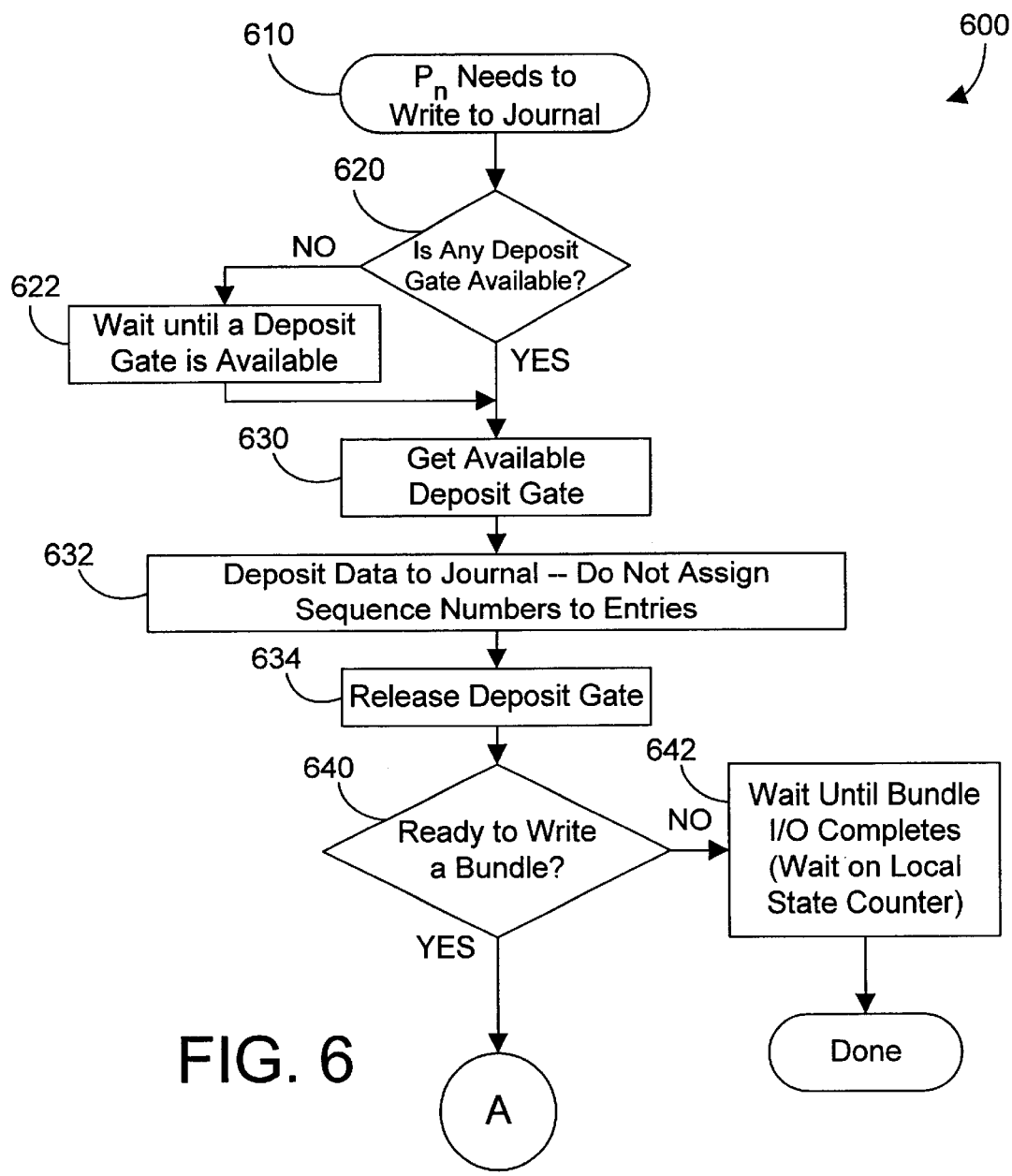
FIG. 6 is a flow diagram of a method for depositing information on one journal arm of the journal in FIG. 5.
Figure 7:
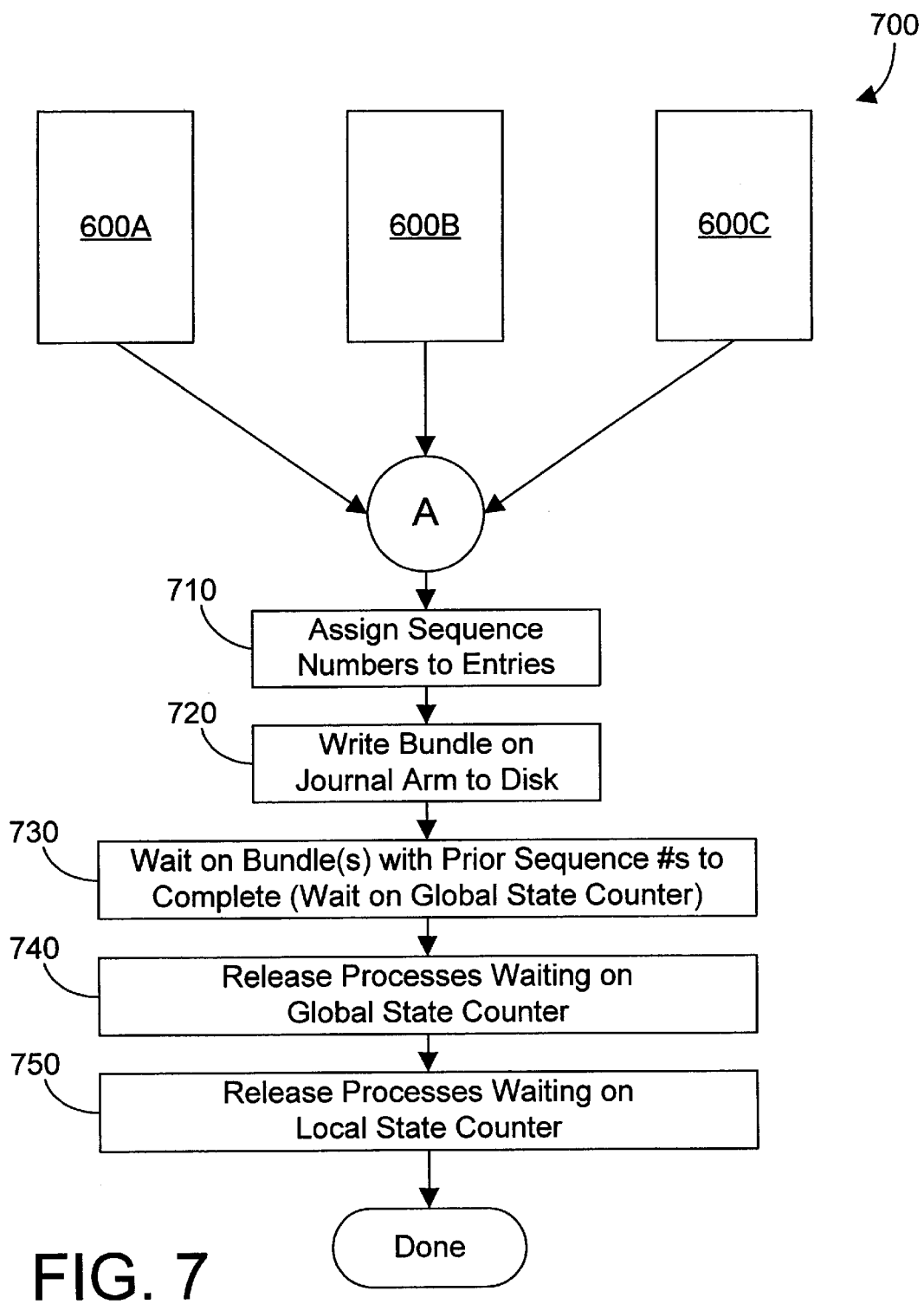
FIG. 7 is a flow diagram of a method for depositing information simultaneously on the three journal arms of FIG. 5.

The detailed operation of journaling system 500 may best be understood by referring to the flow diagrams of FIGS. 6 and 7. Method 600 of FIG. 6 is a method that suitably applies to each arm of the journal, and each arm has a method 600 that runs concurrently with the methods of the other arms. This is represented graphically in FIG. 7, where the three journal arms each have methods 600A, 600B, and 600C that correspond to method 600 of FIG. 6 for each of the three arms for the sample journaling system 500 of FIG. 5. In this manner different processes may perform method 600 in parallel with each other. Method 600 starts when some process n (denoted $P_n$ in FIG. 6) needs to write to the journal (step 610). The process first checks to see if any of the deposit gates for any of the journal arms is available (step 620). For the sample journaling system 500 of FIG. 5, this means that method 600 checks to see if any of the three deposit gates is available. If so (step 620=YES), the process gets one of the available deposit gates (step 630). If not (step 620=NO), the process waits until any deposit gate is available (step 622), and then gets an available deposit gate (step 630).

Once the process has the deposit gate, the process deposits data to the journal (step 632). The journal deposits do not result in the assignment of sequence numbers at this time. The process then releases the deposit gate (step 634). If a bundle is not yet ready to be written (step 640=NO), this may mean that other processes are waiting to write to the journal, so the current process must wait until the bundle I/O completes (step 642). The waiting process thus relies on a future process to write the bundle to disk. If a bundle is ready to be written (step 640=YES), the current process takes responsibility for writing the bundle, as indicated at point A of FIG. 6.

Referring now to FIG. 7, the process that reaches point A has taken responsibility for writing the bundle. At this point the sequence numbers are assigned to the journal entries (step 710). The sequence numbers are in sequential order within a bundle. Referring back to FIG. 5, we assume that the entries are placed on the different journal arms in time-order represented by the alpha order of the data. However, the process that writes entry G to arm #2 determines that this bundle on arm #2 is ready to write to disk before any other bundle on arms #1 and #3 are ready. Because the bundle on arm #2 is ready first, the process that wrote entry G to arm #2 assigns sequential sequence numbers 1, 2, and 3 to the entries in this bundle in step 710. The bundle is then written to disk (step 720). At this point, the process must wait for any bundles that have prior sequence numbers to complete (step 730) by waiting until the global state counter 510 indicates that all prior bundles have completed. The global state counter controls processes waiting for entries that are not in this bundle to be written. When a bundle I/O completes, the processes in this bundle are released, but still must wait for any bundles with earlier sequence numbers to complete (using the global state counter). Once the bundle I/O for processes that have earlier sequence numbers is complete, the processes waiting on the global state counter 510 are released (step 740). The local state counter controls processes waiting on entries in the bundle currently being written for an arm. Once all lower sequence numbered entries are written to disk, the processes waiting on the local state counter for the current arm are also released (step 750).

The journaling system of the first embodiment has some key features. For example, the journal sequence number 230 is global across all arms in the journal. This feature is not a severe bottleneck, however, because the journal sequence number 230 can be incremented as a single atomic field via a compare-and-swap mechanism, thereby assuring very little contention for the journal sequence number 230. Another important feature is that each arm of the journal is independently serialized. A successful deposit on an arm only depends on the successful completion of the prior deposit on that arm. Thus, each arm can have its own serialization mechanism and multiple journal deposits can occur simultaneously on different arms. This feature allows the number of arms in the journal to be tuned to a specific application or system to assure an almost contention-free journal. Thus, for a system that has twenty processors, a number of arms on the journal can be selected to provide a number of parallel deposit points in the journal to assure adequate performance of the journal. In this manner the journaling system of the first embodiment may be scaled as appropriate according to the number of processors and the desired performance of the journal.

Another feature of the first embodiment is that sequence numbers are only assigned to journal bundles immediately before the bundle is written to disk. Thus, it is a race among pending depositors on each journal arm to see who gets the next sequence number S and who gets S+X, where X is the number of entries in the bundle that is assigned sequence number S. In other words, pending journal entries can appear on the journal in an order different than the time-order in which the journal entries were actually requested. Thus, it is the user's responsibility to assure that interdependent entries are serialized before the journaling system is invoked. In the case of common database systems, this serialization exists today as the database record lock.

Note that the effect of storing the journal entries in different time-order than when they were deposited makes it more difficult than in the prior art to process the journal when database recovery becomes necessary. Referring to method 400 of FIG. 4, in the prior art, when the end of a bundle was encountered, the journal knew in step 420 that the next bundle (and hence, the next sequence number to process) resided on the next arm in the round-robin rotation. With the journaling system of the first embodiment, however, the next sequence number can reside on any of the other arms on the journal. The implications of this feature are not too severe, however, and can be mitigated by using asynchronous pre-brings to read areas where the next journal entry may lie on the other arms. By pre-bringing the information on the journal arms, the next sequence number to be processed can be easily located in step 420, and the database recovery process remains as shown in FIG. 4 with the slight modification of pre-brings to locate the next journal entry in step 420.

Some circumstances in a database system require time-based journal retrieval. Because the first embodiment breaks the connection between sequence number and time-order, the journal will not normally be read back in time-order. However, time-order retrieval of data on the journal could easily be performed by providing a timestamp that corresponds to the time when the deposit was made on the journal. The timestamp would allow retrieving the journal based on timestamp rather than sequence number. Thus, the first embodiment provides greater flexibility by allowing journal information to be ready in either sequence number order, or in time order using the timestamp.

While the journaling system according to the first embodiment of the invention provides for excellent scalability of the journal as the number of processors increases, it does so at the cost of requiring changes to some of the ways the database functions. For example, this journaling method impacts the way data space indexes are journaled. Because the time-order of entries in the journal is not preserved, the journal does not support after-image index journaling. However, before image (i.e., virgin page) journaling is supported. Virgin page journaling depends on the assumption that the write of the dataspace journal entry that caused this index change will also cause the write of any dependent index journal entries. In other words, one better see all the index journal entries that are affected by any pending dataspace journal entries written to disk by the time the dataspace journal entry is written to disk. Otherwise, recovery does not work because some dependent piece of the index may not be on the journal. The solution to this problem is to initiate journal bundle I/O after every group of index virgin page deposits. The process of depositing the entries need not wait for journal I/O, but a bundle is initiated thereby assigning sequence numbers to the virgin page index deposits. Thus it is guaranteed that the virgin index page deposits precede any dependent dataspace entry deposits on the journal. Starting a bundle for each group of index deposits will generate more small bundles than we see today on the journal, but the overhead of these I/Os should not cause any arm contention because the user can just add more arms to the journal. Furthermore, the additional journal deposit points will reduce contention enough to compensate for any additional overhead that is incurred from smaller bundles.

The journaling system of the first embodiment also affects how dataspace index sync points are handled. A dataspace index sync point requires that the index and all associated dataspaces are at a database boundary when the sync point is captured. Being at a database boundary implies that all the journal entries corresponding to unforced dataspace and index changes are forced and available for recovery. Since there is not necessarily a time-order among the journal bundles on multiple arms, this implies that all the journal bundles on all the arms must be initiated and written so that sequence numbers are assigned. The next available sequence number can then be assigned to the sync point. Note that in the case of fuzzy sync pointer (i.e., concurrent object changes are permitted during sync point processing) one need not wait for the journal I/O to complete. Simply initiating the I/O for all arms such that sequence numbers get assigned is sufficient.

Unique indexes post yet another dataspace index problem when the journaling system of the first embodiment is used. As explained above, the dataspace record lock is used to assure that interdependent dataspace entries always appear on the journal in the correct time-order. Unique indexes also require that key updates appear in the correct time-order. Since time-order among unrelated dataspace entries is not guaranteed, and since these entries could be changing the same key data, it is possible to get unique key exceptions when processing the journal to recover the index. Consider the scenario where a unique index contains key AA' and the following sequence of events occurs: 1) Key AA' is deleted when dataspace record is deleted; 2) Key AA' is reinserted when dataspace record 2 is updated. Because the dataspace records are independent of one another, it is possible to see dataspace record 2 on the journal before dataspace record 1. If the changes were then applied to the virgin index containing the key AA', then the dataspace record 2 update would cause a unique key exception. This potential problem can be overcome by providing a mechanism to lock key values for the duration of the dataspace update. This is really akin to the concept of a commit key index known in the prior art. In prior art systems, the commit key index locks a key value until a commit transaction completes, and signals an exception if a lock conflict occurs. This same concept can be used in the first embodiment, but the conflicting process must wait until the conflict is resolved rather than signaling an exception. The key value lock is released as soon as the dataspace update is complete. This would serialize interdependent index changes just as the database record locks serialize dataspace updates.

The journaling system of the first embodiment also affects the commit phase of a database transaction, because commit is more dependent on time-order journaling than other database functions. Commit cycles are bracketed by start commit and commit/decommit entries. A secondary start cycle is identified by a sequence number. Thus, commit cycles need to maintain time-order on the journal. This rigid adherence to time-order seems to conflict with the journaling mechanism of the first embodiment. However, the problem of time-order during commit can be handled in the first embodiment by restricting commit cycle deposits to a single arm on the journal. Because entries within a bundle are given sequential sequence numbers, restricting commit cycle deposits to a single arm essentially guarantees time-order of deposits during the commit cycle. Commit cycles are local to a particular process, so the process making commit deposits should not be burdened by restricting commit cycle deposits to a single arm provided there are a sufficient number of journal arms to handle other journal traffic.

Commit cycles typically include a commit identifier, which is data placed in all commit entries to identify the entries for a given commit cycle. In prior art journaling systems, the commit identifier is a sequence number. Because sequence numbers are not assigned until the journal bundle is about to be written, there is no sequence number available to indicate the start commit entry, which is written before the deposits are made to the journal. For the first embodiment, the commit identifier is not a sequence number, but is a different journal-wide identifier. For example, a field in the journal port header, which is completely independent of the journal sequence number, could be used for the commit identifier. This field would be atomically incremented after every request is made to the journal to provide a new commit identifier.

In similar fashion, in prior art journaling systems the start of a secondary commit cycle is identified by a sequence number. Again, the first embodiment cannot assign a sequence number at the beginning of a secondary commit cycle because the sequence numbers are not assigned until later, when the bundle is ready to be written to disk. This potential problem can be avoided by changing secondary commit cycles to use an actual journal entry to identify the start of a secondary cycle, as described above with respect to regular commit cycles.

Many of the aspects of the first embodiment that make it incompatible with present database systems are alleviated by the second embodiment of the invention. While the second embodiment does not scale as well as the first embodiment to a high number of processors, it does provide good scaling for a reasonable number of processors. It is estimated that the second embodiment will provide good scaling for up to 20 processors, while maintaining compatibility with known database systems.

The second embodiment allows multiple journal deposit points while still maintaining physical time-ordering among journal entries. This is accomplished by having one deposit gate per journal arm and allowing multiple arms to participate in a journal bundle. A single journal arm can belong to, at most, one journal bundle. When an entry is made, it can go to any free arm that is already part of the current bundle or an adjacent free arm may be added to the bundle to house the entry. When the bundle is written to disk, all active arms for the bundle must write to disk. Thus, the ring of journal arms must be viewed as a ring of journal bundles where multiple arms are grouped together to form a bundle with multiple deposit points. The multiple gates per bundle helps scaling of the journaling system as the number of processors in a system increases.

Figure 8:
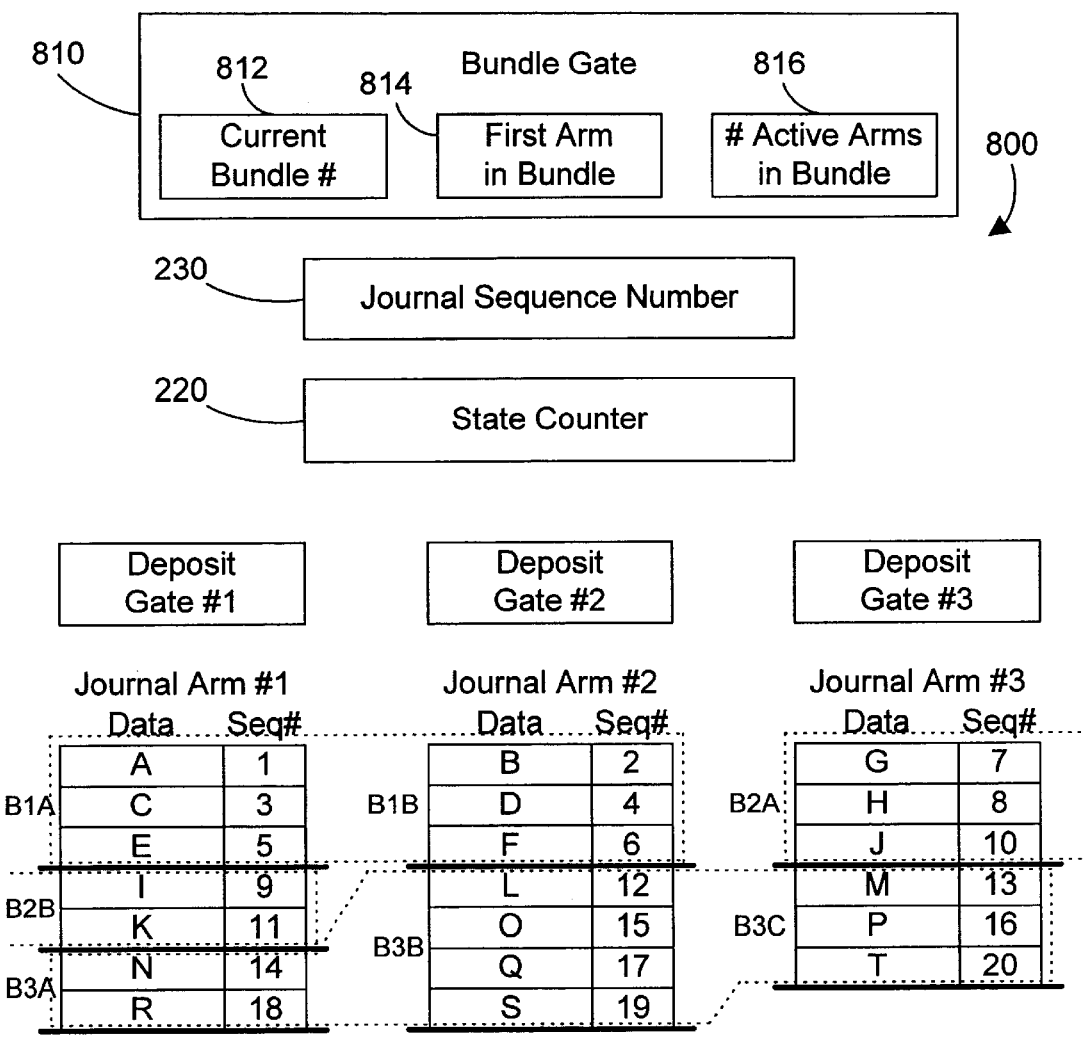
FIG. 8 is a block diagram of a database journal in accordance with a second embodiment of the present invention.

Referring to FIG. 8, a journaling system 800 in accordance with the second embodiment maintains the correlation between time-order of the entries and sequence numbers of the entries, while still providing simultaneous deposit points on different arms. Journaling system 800 includes a bundle gate 810, a journal sequence number 230, and a state counter 220. Each arm on the journal has a corresponding deposit gate. Bundle gate 810 tracks the current bundle number 812, a pointer 814 to the first arm in the bundle, and the number of arms currently active in the bundle 816. Note that the concept of a "bundle" in this context is slightly different than in the prior art and first embodiment of the invention. A bundle for the second embodiment refers to a group of journal entries that lie on one or more arms of the disk drive, rather than all lying on one arm.

Figure 9:
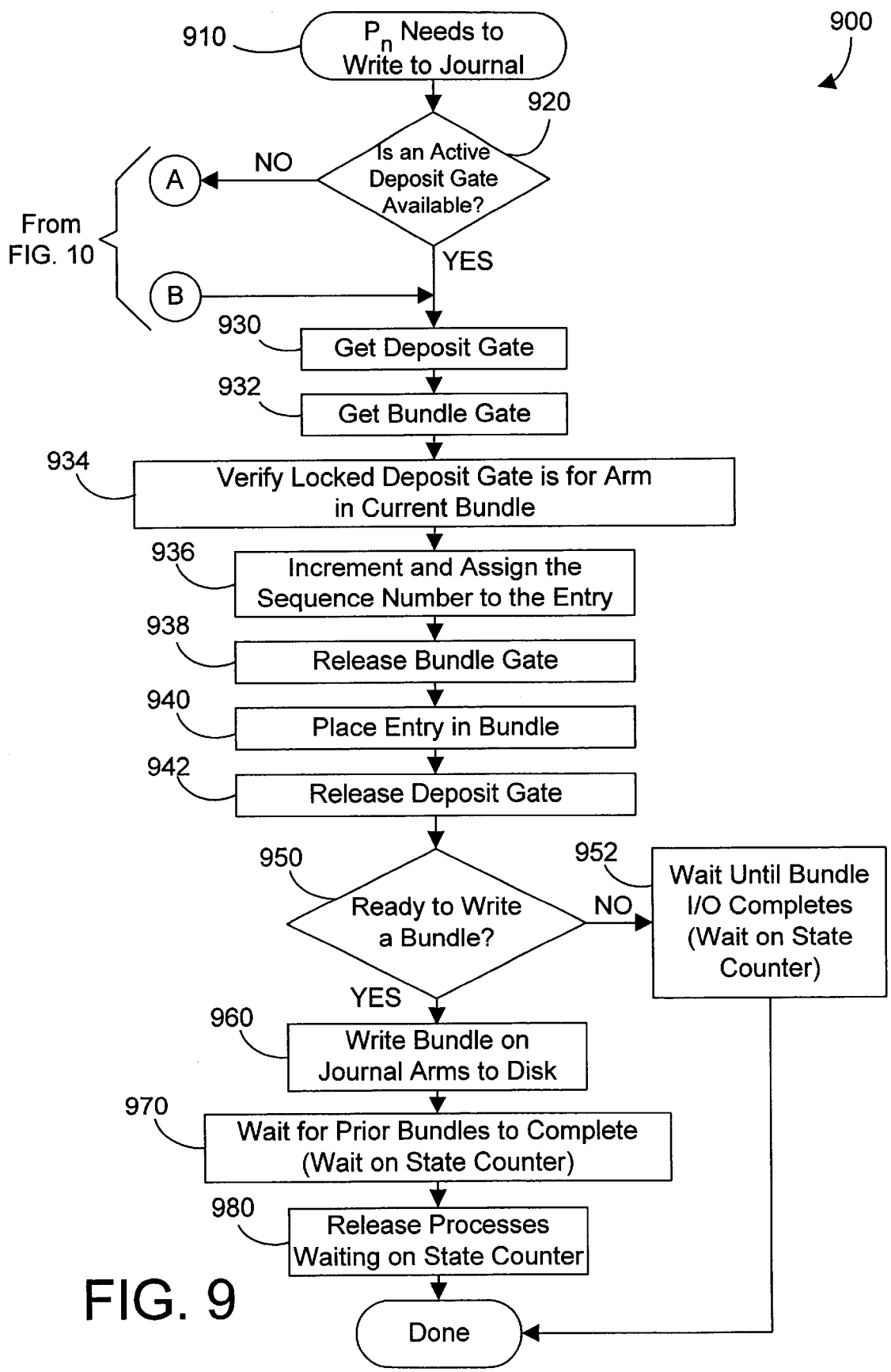
FIG. 9 is a flow diagram of a method for depositing information simultaneously on the three journal arms of FIG. 8.
Figure 10:
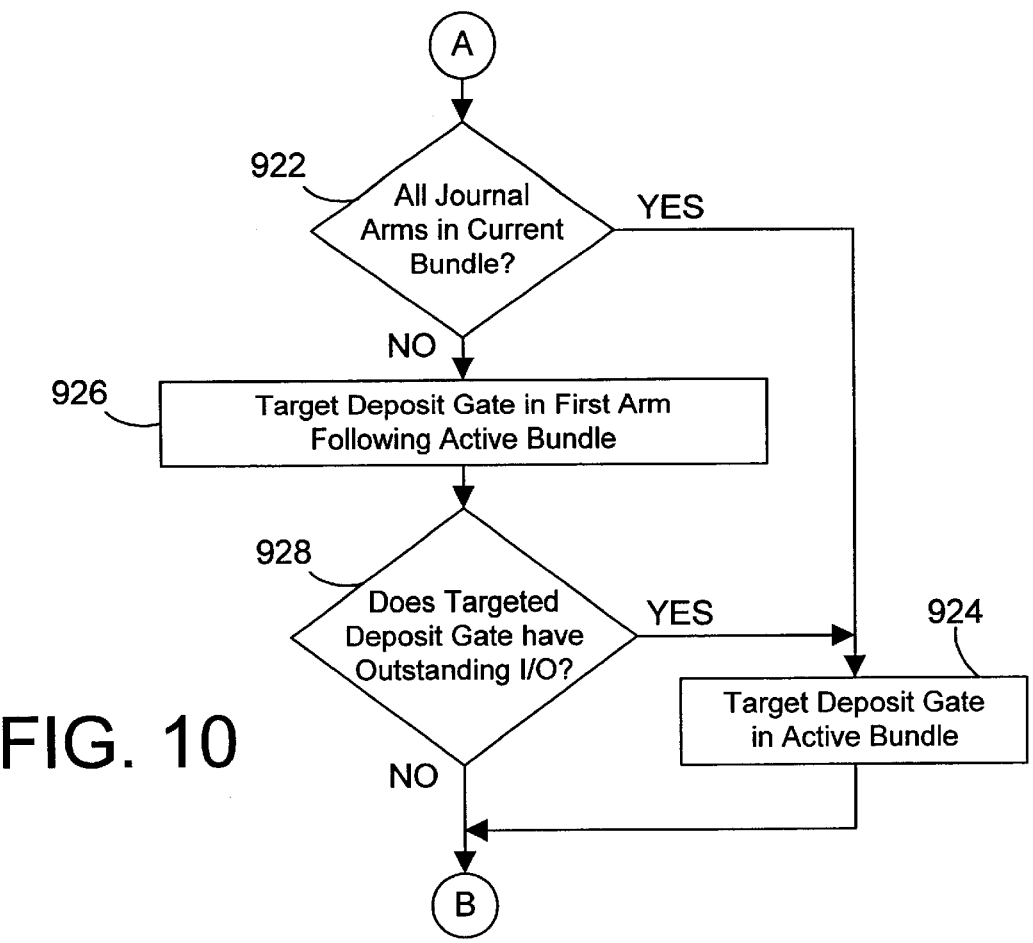
FIG. 10 is a flow diagram of a portion of the method of FIG. 9.

The operation of journaling system 800 of FIG. 8 is best understood with reference to the flow diagram of method 900 of FIG. 9. Method 900 begins when some process $P_n$ needs to write to the journal (step 910). First, the process checks to see if any active deposit gate is available (step 920). A deposit gate is "active" when it can be part of the current bundle. Thus, an active deposit gate corresponds to an arm that can accept deposits. If an active deposit gate is available (step 920=YES), the process gets the deposit gate (step 930). If an active deposit gate is not available (step 920=NO), control is transferred to point A in FIG. 10. If all journal arms are already in the current bundle (step 922=YES), the process targets a deposit gate in the active bundle (step 924). If not all journal arms are in the current bundle (step 922), the process tries to add an additional arm to the bundle. This is accomplished by targeting the deposit gate in the first arm following the active bundle (step 926). Next, we check to see if the targeted deposit gate has outstanding I/O (step 928). If so (step 928=YES), the next arm is unavailable to be added to the current bundle, and the process instead targets a deposit gate in the active bundle (step 924). If there is no outstanding I/O in step 928, the next arm may be added to the current bundle, which is reflected by the fact that the deposit gate in the new arm is targeted in step 926. Thus, when control is transferred back to point B in FIG. 9, one of two deposit gates will be targeted, either the deposit gate for the next arm (if an arm may be added to the bundle) or the deposit gate for one of the arms in the current bundle. Method 900 then gets the targeted deposit gate (step 930). Once a deposit gate is owned by the process, the process also gets the bundle gate (step 932). The process then verifies that the deposit gate owned by the process is for an arm in the current bundle (step 934). This is determined by looking at the first arm in the bundle 814 and the number of active arms in the bundle 816. Next, the journal sequence number 230 is incremented and assigned to the entry (step 936). The bundle gate is then released (step 938), the entry is placed in the bundle (step 940), and the deposit gate is released (step 942). At this point, if the process making the journal deposit is not ready to write a bundle (step 950=NO), the process then waits until the I/O for that bundle completes, which is accomplished by waiting on the state counter 220, knowing that a future process will perform the I/O for that bundle. If the process is ready to write a bundle (step 950=YES), the process writes the bundle on the one or more journal arms that comprise the bundle to disk (step 960). At this point the process must wait for any prior bundles to complete their I/O to maintain the time-order of the journal entries (step 970). The state counter in the second embodiment is used much as it is in the prior art, causing processes with later sequence numbers to wait to be released until all bundles with earlier sequence numbers complete. Once the I/O for prior bundles is complete, the processes waiting on the state counter are released (step 980), and method 900 is complete.

Figure 11:
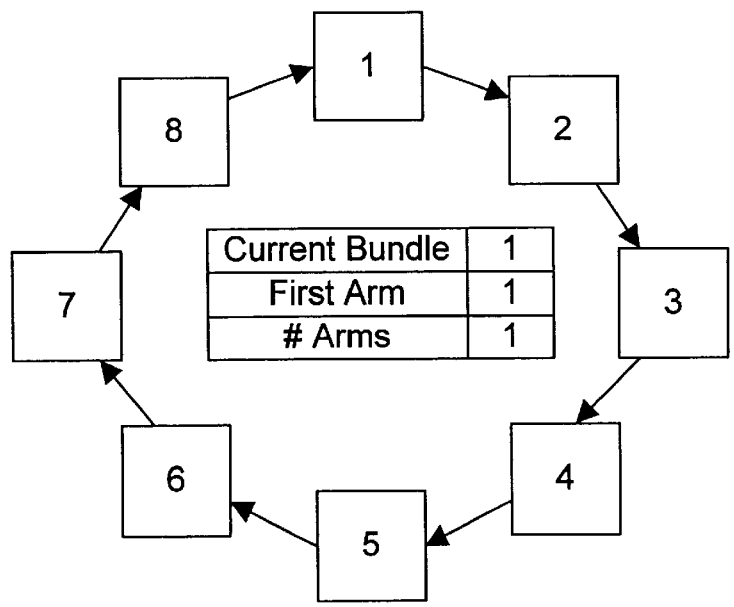
FIGS. 11–15 each disclose a sample journal that has eight arms in various stages of deposit and I/O to illustrate the concepts of the second embodiment.
Figure 12:
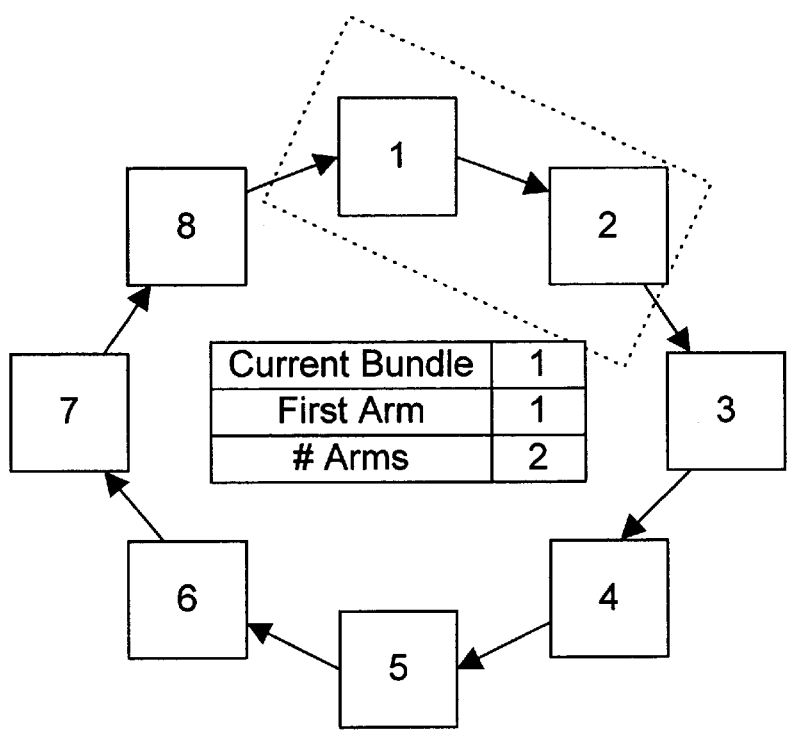
Figure 13:
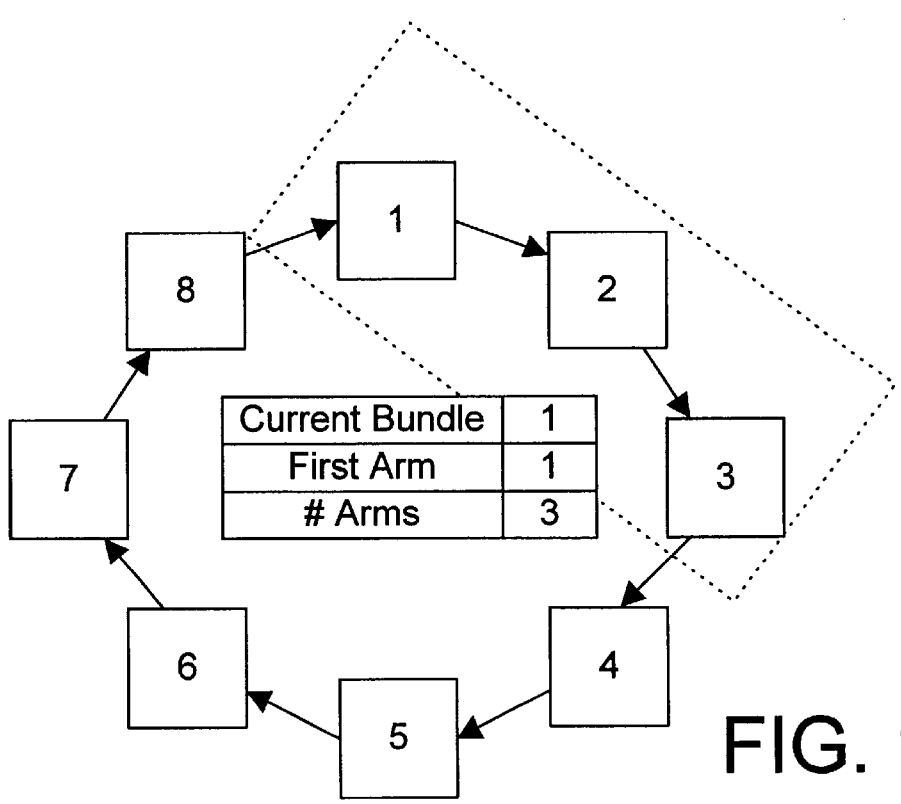

An example will help to illustrate the concepts of the second embodiment. Referring to FIG. 11, eight arms are provided on a sample journal. These arms are shown in a round-robin format. We assume that the first bundle to be written resides on a single arm. For the journal of FIG. 11, we start with the current bundle set to one, the first arm set to one, and the number of arms set to one. Next, we assume that a journal deposit sees contention on the deposit gate for arm #1. To accommodate this contention, arm #2 is added to the bundle. Arms #1 and #2 now receive deposits in parallel. This is indicated by the dotted lines surrounding arms #1 and #2 in FIG. 12, and the number of arms being increased to 2. We assume another entry to the journal has seen contention on both deposit gates for arms #1 and #2, so another arm (arm #3) is added to the bundle. The bundle is thus shown by the dotted lines surrounding arms #1, #2 and #3 in FIG. 13.

Figure 14:
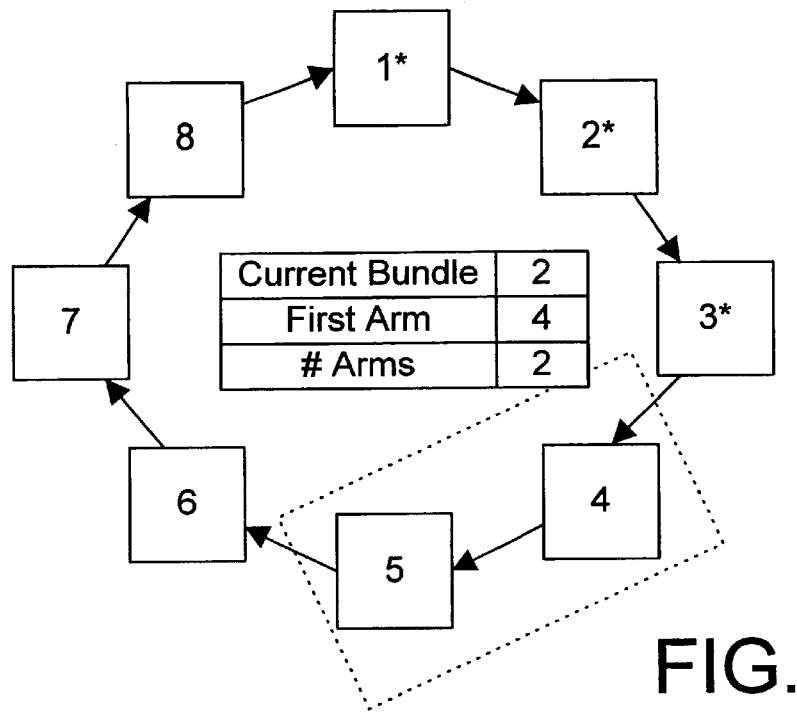

At this point, we assume a process starts a bundle I/O for the first bundle, which causes an I/O to issue against the active group of arms for the bundle. Arms #1, #2 and #3 have a write outstanding, which is indicated in FIG. 14 with an asterisk next to those numbers. We assume that arms #4 and #5 are now in the active bundle. At this point, the current bundle is 2, the first arm is arm #4, and the number of arms is 2.

Figure 15:
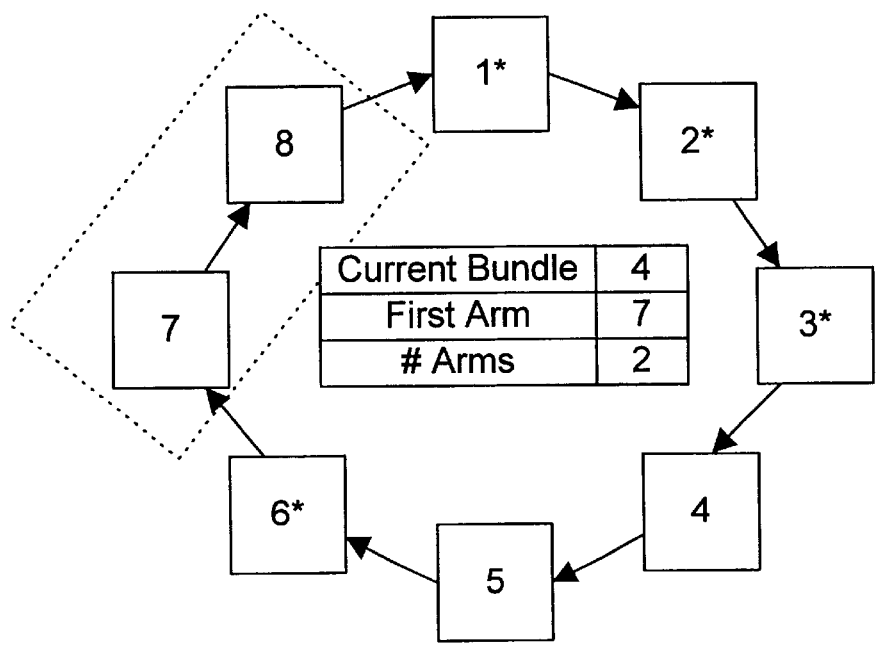

Next, we assume that the bundle I/O for the second bundle is performed, and that a third bundle is deposited all on one arm, arm #6. Bundle I/O for the bundle on arm #6 is commenced, and the active bundle now includes arms #7 and #8, as shown in FIG. 15. At this point, the current bundle is 4, the first arm is arm #7, and the number of arms is 2. We assume that the outstanding I/O for arms #4 and #5 has completed, but that the I/O for arms #1, #2, #3, and #6 are still outstanding. I/O on arms #1, #2 and #3 will complete together when all three are complete, because the three arms together make up the bundle. Arms #7 and #8 comprise the current bundle. We assume at this point that there is now contention on both deposit gates #7 and #8. Ideally, the second embodiment would like to add another arm to the bundle, but the next arm is arm #1, which still has an I/O outstanding. The current bundle must keep accepting entries until arm #1 shows no outstanding I/O. When arm #1 completes its I/O, it may be added to the active bundle, or the I/O on the active bundle may be started, depending on how long bundle 4 was active. In this manner the number of arms in a bundle may be dynamically determined according to the degree of contention for the journal and the number of available arms.

The present invention is an improvement over the prior art by allowing for simultaneous deposits by different processes on a database journal. By allowing two processes to deposit on the journal in parallel, the throughput of a computer system that implements the journal in accordance with the preferred embodiments will be much better than prior art systems that serialize all journal deposits.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
   at least one processor;
   a memory coupled to the at least one processor;
   a journaling system for a database, the journaling system residing in the memory and including:
      a journal having a plurality of journal arms; and
      a journal deposit mechanism that allows simultaneous deposits by a plurality of processes on more than one of the plurality of journal arms.

2. An apparatus comprising:
   at least one processor;
   a memory coupled to the at least one processor;
   a database journal residing in the memory, the journal having a plurality of journal arms; and
   means for a plurality of processes to simultaneously deposit data on more than one of the plurality of journal arms.

3. An apparatus comprising:
   at least one processor;
   a memory coupled to the at least one processor;
   a database journal residing in the memory, the journal having a plurality of journal arms, the journal including a plurality of bundles, a current bundle comprising one of the plurality of bundles that is currently being written to the journal;
   a global state counter that is used to control processes waiting for entries in the journal that are not in the current bundle; and
   a local state counter for each of the plurality of journal arms, the local state counter being used to control processes waiting on entries in the journal that are in the current bundle.

4. An apparatus comprising:
   at least one processor;
   a memory coupled to the at least one processor;
   a database journal residing in the memory, the journal having a plurality of journal arms, the journal including a current bundle;
   a bundle gate that tracks the journal arms for each of a plurality of bundles, a current bundle comprising one of the plurality of bundles that is currently being written to the journal, each bundle potentially including data from more than one of the plurality of journal arms;
   a state counter that is used to control processes waiting for entries in the journal that are not in the current bundle.

5. A method for saving information to a database journal having a plurality of journal arms, the method comprising the step of:
   a first process making a deposit to a first of the plurality of journal arms; and
   a second process making a deposit to a second of the plurality of journal arms while the first process is making the deposit to the first of the plurality of journal arms.

6. A method for making simultaneous deposits by a plurality of processes to a database journal having a plurality of journal arms, the method comprising the steps of:
   (A) each process performing in parallel with the other processes the steps of:
      (1) depositing data to a selected one of the plurality of journal arms without assigning sequence numbers to the data;
      (2) determining whether the process depositing data to the selected journal arm should write a bundle from the journal to a direct access storage device;
   (B) when one of the plurality of processes should write a bundle from the journal to the direct access storage device, assigning sequence numbers to the data deposited on the journal before writing the bundle to a direct access storage device.

7. The method of claim 6 wherein each bundle is stored entirely on one of the plurality of journal arms.

8. A method for making simultaneous deposits by a plurality of processes to a database journal having a plurality of journal arms, the method comprising the steps of:

(A) each process performing in parallel with the other processes the steps of:
  (1) depositing data to a selected one of the plurality of journal arms, the data being part of a bundle, the bundle potentially including data from more than one of the plurality of journal arms;
  (2) determining whether the process depositing data to the selected journal arm should write a bundle from the journal to a direct access storage device;
(B) a selected one of the plurality of processes writing the bundle to a direct access storage device.

9. A method for making simultaneous deposits by a plurality of processes to a database journal having a plurality of journal arms, the method comprising the steps of:
(A) assembling deposits into a plurality of sequential bundles, a current bundle comprising one of the plurality of bundles that is currently being written to the journal;
(B) providing a global state counter that is used to control processes waiting for entries in the journal that are not in the current bundle;
(C) providing a plurality of deposit gates, one for each of the plurality of journal arms;
(D) providing a plurality of local state counters, one for each of the plurality of journal arms, each local state counter being used to control processes waiting on entries in the journal that are in the current bundle;
(E) each process performing in parallel with the other processes the steps of:
  (1) getting one of the plurality of deposit gates;
  (2) depositing data to the journal arm corresponding to the one deposit gate without assigning sequence numbers to the data;
  (3) releasing the one deposit gate; and
  (4) determining whether the process depositing data to the journal arm should write a bundle from the journal to a direct access storage device;
(F) when a selected one of the plurality of processes should write a bundle from the journal to the direct access storage device, the selected process assigning sequence numbers to the data deposited on the journal before writing the current bundle to a direct access storage device;
(G) the selected process waiting for any bundles with prior sequence numbers to be written to the direct access storage device by waiting on the global state counter;
(H) releasing any of the plurality of processes waiting on the global state counter by sending a value to the global state counter; and
(I) releasing any of the plurality of processes waiting on the local state counter by sending a value to the local state counter.

10. The method of claim 9 wherein each bundle is stored entirely on one of the plurality of journal arms.

11. A method for making simultaneous deposits by a plurality of processes to a database journal having a plurality of journal arms, the method comprising the steps of:
(A) providing a bundle gate that tracks the journal arms for each of a plurality of bundles, each bundle potentially including data from more than one of the plurality of journal arms, a current bundle comprising one of the plurality of bundles that is currently being written to the journal;
(B) providing a state counter that is used to control processes waiting for entries in the journal that are not in the current bundle;
(C) providing a plurality of deposit gates, one for each of the plurality of journal arms;
(D) each process performing in parallel with the other processes the steps of:
  (1) getting one of the plurality of deposit gates that is active for the current bundle;
  (2) getting the bundle gate;
  (3) verifying that the one deposit gate corresponds to a journal arm in the current bundle;
  (4) releasing the bundle gate;
  (5) depositing data to the journal arm corresponding to the one deposit gate, assigning sequence numbers to the data as it is deposited;
  (6) releasing the one deposit gate; and
  (7) determining whether the process depositing data to the journal arm should write a bundle from the journal to a direct access storage device;
(E) when a selected one of the plurality of processes should write a bundle from the journal to the direct access storage device, the selected process writing the current bundle to a direct access storage device;
(F) the selected process waiting for any bundles with prior sequence numbers to be written to the direct access storage device by waiting on the state counter; and
(G) releasing any of the plurality of processes waiting on the state counter by sending a value to the state counter.

12. A program product comprising:
(A) a journal deposit mechanism that allows a plurality of processes to make simultaneous deposits on more than one of a plurality of journal arms; and
(B) signal bearing media bearing the journal deposit mechanism.

13. The program product of claim 12 wherein the signal bearing media comprises recordable media.

14. The program product of claim 12 wherein the signal bearing media comprises transmission media.

15. The program product of claim 12 wherein the journal deposit mechanism comprises:
a global state counter that is used to control processes waiting for entries in the journal that are not in the current bundle; and
a local state counter for each of the plurality of journal arms, the local state counter being used to control processes waiting on entries in the journal that are in the current bundle.

16. The program product of claim 12 wherein the journal deposit mechanism comprises:
a bundle gate that tracks the journal arms for each of a plurality of bundles, a current bundle comprising one of the plurality of bundles that is currently being written to the journal, each bundle potentially including data from more than one of the plurality of journal arms;
a state counter that is used to control processes waiting for entries in the journal that are not in the current bundle.

* * * * *